Dec. 20, 1938.  B. NEUPERT  2,141,112
EGG CARRYING DEVICE
Filed July 13, 1937  2 Sheets-Sheet 1
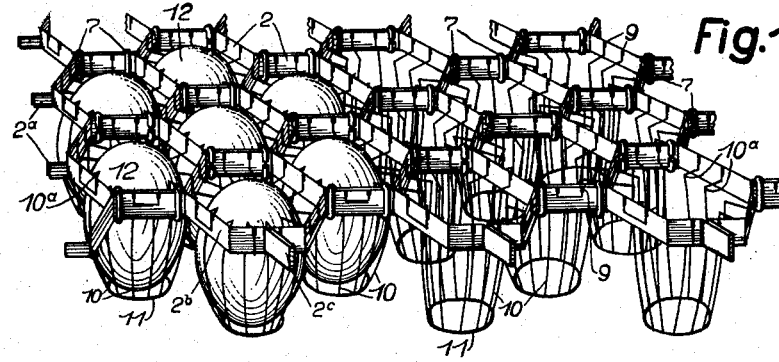
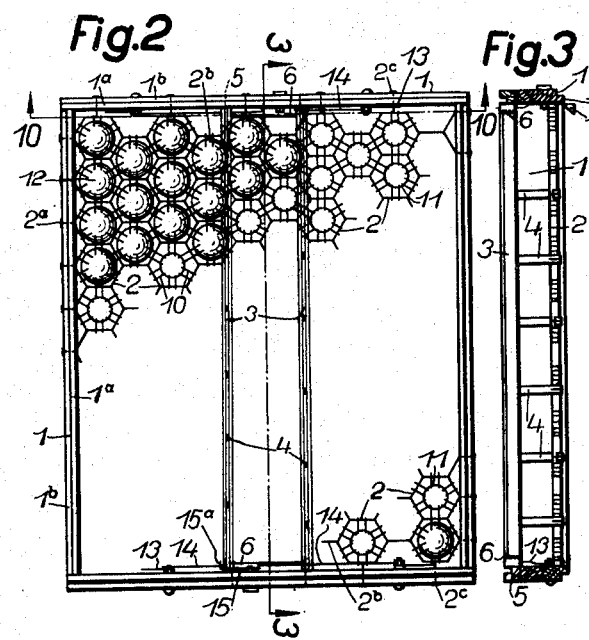
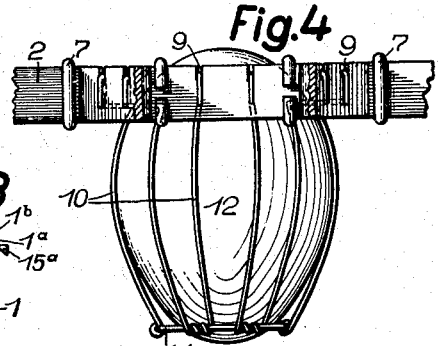
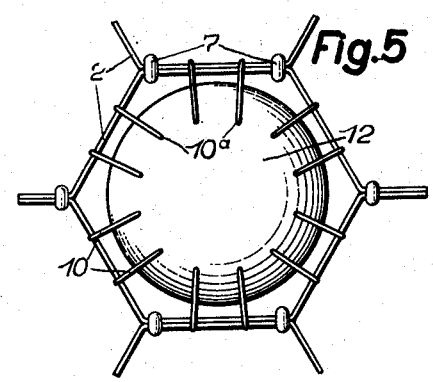
Inventor,
Bernhard Neupert,
Frank S. Appleman
BY  Attorney Dec. 20, 1938.     B. NEUPERT     2,141,112
EGG CARRYING DEVICE
Filed July 13, 1937     2 Sheets-Sheet 2
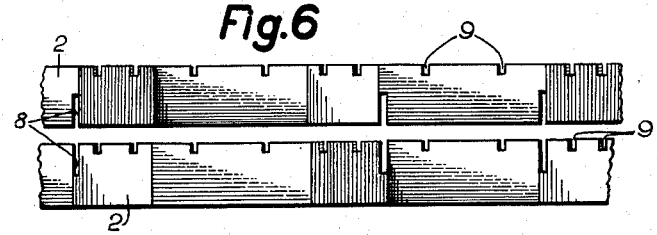
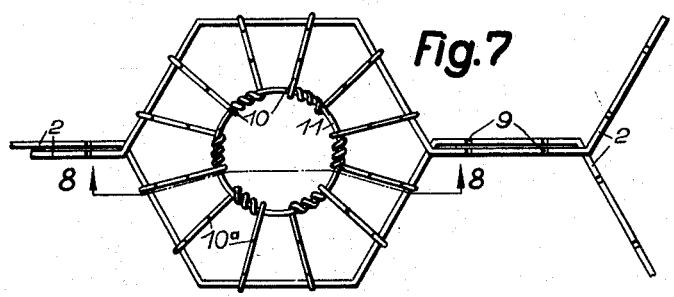
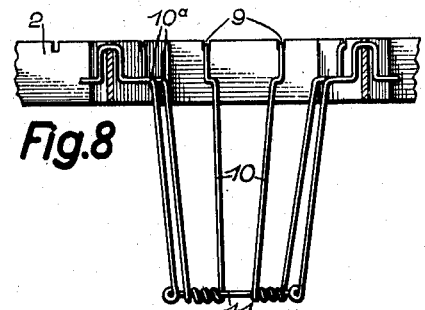 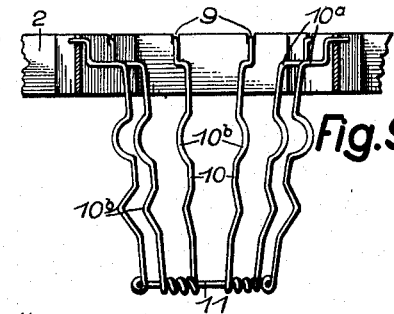
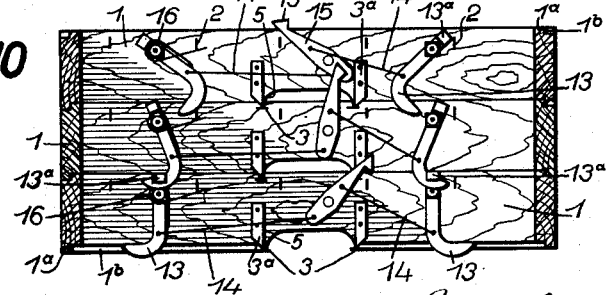

Patented Dec. 20, 1938

2,141,112

UNITED STATES PATENT OFFICE 2,141,112

EGG CARRYING DEVICE

Bernhard Neupert, Briesnitz over Sagan, Germany

Application July 13, 1937, Serial No. 153,435
In Germany March 5, 1935

5 Claims. (Cl. 217—28)

This invention relates to a carrying device for eggs, which combines large holding capacity with light weight and small size.

The device according to the invention comprises a frame, a honeycombed net suspended in the free space of the frame and basketlike cells suspended in the compartments formed by the net for the reception of the eggs. The frames may be combined to form a shipping container holding up to one thousand eggs, and such a container may be transported in any position without involving the risk of breakage of the eggs. The eggs are firmly disposed in elastic cells movably suspended in the net, and the cells hold the eggs in position by means of elastic wires. Eggs may be candled while in the frames which may serve also for sale and display. Owing to the particular arrangement of the wire cells, air can flow around each egg from all sides, and the eggs can thus be preserved while in the frame. The frames may further be placed in incubators, as they can be turned without dropping the eggs. Since tilting and rough handling during transportation cannot injure the eggs resting in springy cells, losses due to cracking are eliminated.

By way of example, the invention is illustrated in the accompanying drawings, in which Figure 1 is a diagrammatic view of a corner of the honeycombed net provided with partly filled springy carrying cells for the eggs; Fig. 2 is a diagrammatic top view of a single frame showing the arrangement of the cells; Fig. 3, a longitudinal vertical section on the line 3—3, of Fig. 2; Figs. 4 and 5 are, respectively, a side and top view of a single cell with the egg inserted therein; Fig. 6 is an elevation of a modified form of the steel band strips forming the net prior to their assembly; Fig. 7 is a top view of the assembled steel band strips of Fig. 6 with a wire cell inserted therein; Fig. 8 is a section on the line 8—8, of Fig. 7; Fig. 9 is a section similar to the one shown in Fig. 8, but with a modified form of wire cell; and Fig. 10 is a section on the line 10—10, of Fig. 2 showing several superposed frames on an enlarged scale, which are partly locked relative to one another.

Referring to the drawings, a frame 1 preferably made of wooden bars and having a square or rectangular shape supports a honeycombed net 2 the hexagonal compartments of which are formed by correspondingly bent and joined steel bands. The bands 2 running from one to the other side of the frame 1 have their ends 2ª on both sides inserted in pairs through slots in the side bars and bent over on the outside of the frame. Unlike all other steel bands, the two bands nearest the front and rear bars of the frame are not formed of a continuous strip but of a plurality of partial strips 2ᵇ corresponding in length to the distance of two cells in the transverse row and passing at their points of juncture with the ends 2ᶜ through slots in the front and rear bars of the frame at the outside of which the ends are bent over. Owing to this manner of fastening, the net 2 held between the inner faces of all four bars of the frame immediately below the top edges of the bars is uniformly supported by all four walls in a perfectly elastic manner, so that impacts and vibrations due to transportation are fully taken up or considerably reduced.

As further supports of the net 2 two rails 3, 3 are provided within the net parallel to the side bars, as indicated in Fig. 2, and their rectangularly bent ends 3ª are secured to the inner surfaces of the two front and rear bars of the frame to support these bars relative to one another and thereby to impart increased stiffness to the entire frame. The rails 3 are fitted at regular intervals with vertical braces 4 the upper ends of which are secured to the net 2 to support it and impart to it greater carrying capacity.

As indicated in Fig. 10, the front and rear bars of the frame are provided in the center of their lower edge with a clearance 5. These clearances 5 serve as handles for carrying a single frame or a shipping container comprising several frames and form also air supply openings for a container filled with eggs and shut off by a cover and bottom. To protect the eggs nearest the clearances 5 against damage or injury by the fingers engaging the clearances U-shaped protective strops 6 are provided behind the clearances 5 on the inner faces of the front and rear bars of the frame.

The steel bands 2 forming the net are firmly connected. In the constructions shown in Figs. 1 to 5 connection is effected by cramps 7, always holding together two flatly juxtaposed strips at the corners of the hexagonal compartments. Instead of cramps other fastening means may be used of course, such as hollow rivets or small screws, or the steel bands could be welded or soldered where necessary.

Figs. 6 to 9 illustrate a manner of fastening which obviates the use of special fastening means owing to the provision of the slots 8 cut into two adjacent steel bands from opposite sides up to half the width of the bands. The slots 8 of the bands 22 are fitted together so as to cause engagement of the adjacent sections of the bands. The slots 8 may also be alternately cut from above or below into successive sections of the same band or otherwise arranged, but the arrangement should always be such that the joined bands 22 come flush with their edges.

Furthermore, the steel bands 22 are provided at each straight section with two smaller notches 9 open on top in which the wires 10 forming the cell are movably suspended. The upper portion of each cell 11 is larger than the lower one, and the entire cell is smaller than the basic form of the hexagon formed by the steel bands. In the example shown each cell comprises twelve elastic wires 10 which slightly converge towards the base of the cell and with their ends form a ring 11 the opening of which is smaller than the diameter of an egg. As the cell is open below, an egg can be candled while still in the frame.

The cell wires 10 are movably suspended in their slots 9 and secured therein in such manner that they cannot slide upwardly. This is effected by slightly upsetting the band material after insertion of the wires 10 and thus closing the slots 9.

As shown in Fig. 8, each wire 10 possesses in its upper part an angular portion 10a which prevents the egg 12 inserted in the cell from slipping out. The egg is reliably held by all wires 10 of a cell which adapts itself to any shape of egg, and an egg can be released from a cell only by the exertion of slight pressure upon it from below through the opening of the ring 11 and by pushing it up against the action of the cell wires. When an egg 12 is inserted in a cell, the wires 10 are laterally displaced and thereby uniformly stressed as to elasticity, so that the springiness of the individual wires 10 and, above all, of the angles 10a is not crippled. The angular shape of the wires 10, furthermore, steadies the cell in lateral direction and prevents lateral oscillation of the egg. The angle 10a insures also springiness of the cell in upward and downward directions, and to increase this springiness the wires 10 below the angles 10a may be provided with bends 10b of different forms, as indicated in Fig. 9.

Instead of wire, the elastic cell may consist also of board or similar material and form a downwardly tapering truncated conical hollow body, or the cells may be made from strips of spring steel or other springy material, provided the egg 12 can be firmly embedded in the cell safe from impacts.

The frames 1 may be superposed to form a shipping container, as indicated in Fig. 10, in which case the contacting front edges of the frames 1 engage one another with their projections 1a, 1b to prevent relative displacement. The frames are firmly connected by known means. In the construction shown the connecting members comprise two hooks 13 rotatably disposed on each inside surface of the front and rear bars and articulated by a rod 14 to a hand lever 15 also rotatably disposed on the inside face of a bar. The hook portions facing the sides of the frame are approximately on a level with the lower edges of the bars 1 when the hooks 13 are in a position of rest. Actuation of the lever 15 causes the hooks 13 to be withdrawn from the position of rest and the ends thereof to engage eyes 13a arranged near the top edges of the front and rear bars of the frame 1 next below the hook carrying frame. In the example shown, the eyes 13a are formed by extending the opposite ends of the hooks 13 of the lower frame beyond their bearings and bending them. The hooks 13 thus constitute both the movable closing members of the frame to be attached and the stationary eyes 13a for the frame underneath. One of the hooks 13, 13 disposed on the same bar is acted upon by a rotary spring 16 which tends to push the entire closure back into inoperative position at which the hooks 13 and the operating lever 15 lie fully covered behind the bar carrying them. The lever 15 has a suitable handle 15a formed for instance by bending the upper end of the lever.

By means of the connection described any number of single frames 1 may be combined into a shipping container. If a single frame has a holding capacity of, say, one hundred eggs, containers accommodating any number of eggs up to maximum may be assembled. Existing shipping crates and cartons, etc., are intended for definite numbers, so that increased costs of transportation and special packing troubles are involved if fewer eggs than the crate actually holds have to be shipped.

Compared with the known art, the shipping container according to the invention represents therefore an improvement, the more so as it can be easily separated again into single frames which may be supplied to customers, particularly housewives, who thus always have a suitable and handy egg container.

For shipping the superposed frames 1 may be closed above and below by a cover and bottom.

I claim:—

1. An egg carrying unit comprising a frame having front, rear and side walls, a comb-like grill extending across one open end of said frame, said grill comprising a plurality of corrugated strips arranged between opposite side walls of said frame in abutting and parallel relationship to each other, said strips being staggered with respect to each other to cause the corrugations of each strip to cooperate with the corrugations of the abutting strips to form the cells of said grill, means connecting said strips together, means connecting said grill to all four walls of said frame, a removable and resilient egg carrying cage carried within each cell of said grill, each of said cages comprising a depending cylinder of spaced resilient wires arranged substantially vertically and in substantial parallel relationship with each other, the lower ends of said wires being connected to form a rigid ring, said cylinder having a diameter less than that of an egg but being expansible laterally to resiliently grip an egg inserted therein, and means connecting said cage to the strips forming its cell and positioning said cage centrally of said cell.

2. An egg carrying unit comprising a frame having front, rear and side walls, a comb-like grill extending across one open end of said frame, said grill comprising a plurality of corrugated strips arranged between opposite side walls of said frame in abutting and parallel relationship to each other, said strips being staggered with respect to each other to cause the corrugations of each strip to cooperate with the corrugations of the abutting strips to form the cells of said grill, means connecting said strips together, means connecting said grill to all four walls of said frame, a removable and resilient egg carrying cage carried within each cell of said grill, each of said cages comprising a depending cylinder of spaced resilient wires arranged substantially vertically and in substantial parallel relationship with each other, the lower ends of said wires being connected to form a rigid ring, said cylinder having a diameter less than that of an egg but being expansible laterally to resiliently grip an egg inserted therein, and the upper ends of said wires being formed to provide means connecting said cage to the strips forming its cell and positioning said cage centrally of said cell.

3. An egg carrying unit comprising a frame having front, rear and side walls, a comb-like grill extending across one open end of said frame, said grill comprising a plurality of corrugated strips arranged between opposite side walls of said frame in abutting and parallel relationship to each other, said strips being staggered with respect to each other to cause the corrugations of each strip to cooperate with the corrugations of the abutting strips to form the cells of said grill, means connecting said strips together, means connecting said grill to all four walls of said frame, a removable and resilient egg carrying cage carried within each cell of said grill, at least one bracing member for said frame, said bracing member connecting opposite walls of said frame below said grill and extending at right angles to said strips, and means connecting said bracing member to said grill.

4. An egg carrying unit according to claim 1, in which the resilient wires have angular portions which prevent the egg inserted in the cell from slipping out.

5. An egg carrying unit according to claim 2, in which the resilient wires have angular portions which prevent the egg inserted in the cell from slipping out.

BERNHARD NEUPERT.